United States Patent [19]
Terada et al.

[11] Patent Number: 5,948,340
[45] Date of Patent: Sep. 7, 1999

[54] DIE AND METHOD FOR MOLDING CAGE OUT OF SYNTHETIC RESIN

[75] Inventors: Tadahiro Terada, Kitakatsuragigun; Shigetaka Ashida, Ikomagun, both of Japan

[73] Assignee: Koyo Seiko Co., Ltd., Osaka, Japan

[21] Appl. No.: 09/014,382

[22] Filed: Jan. 27, 1998

[30] Foreign Application Priority Data

May 19, 1997 [JP] Japan .................................. 9-128386

[51] Int. Cl.⁶ .................................................. B29C 45/22
[52] U.S. Cl. ............................ 264/328.8; 264/328.12; 425/573
[58] Field of Search ................... 264/328.1, 328.12, 264/328.8; 425/573, 546, 812, DIG. 42, DIG. 47

[56] References Cited

U.S. PATENT DOCUMENTS

| | | | |
|---|---|---|---|
| 4,333,899 | 6/1982 | Hogan et al. | 264/328.12 |
| 4,511,184 | 4/1985 | Schauf et al. | 264/328.12 |
| 4,654,181 | 3/1987 | Brandenstein et al. | 264/328.12 |
| 4,668,209 | 5/1987 | Kyoosei et al. | 264/328.12 |
| 5,275,549 | 1/1994 | Yamasaki | 264/328.12 |
| 5,288,451 | 2/1994 | Schad | 264/328.12 |
| 5,307,229 | 4/1994 | Sata | 264/328.12 |

FOREIGN PATENT DOCUMENTS

| | | |
|---|---|---|
| 0508732-A2 | 10/1992 | European Pat. Off. . |
| 0573232-A1 | 12/1993 | European Pat. Off. . |
| 135182-9 | 5/1964 | France . |
| 371869-3-A1 | 12/1988 | Germany . |
| 1-44927 | 10/1989 | Japan . |
| 465234 | 5/1937 | United Kingdom . |

OTHER PUBLICATIONS

Rosato et al., Injection Molding Handbook, 2nd edition, pp. 257, 259, 479–481 and 833, 1995.

*Primary Examiner*—Jill L. Heitbrink
*Attorney, Agent, or Firm*—Birch, Stewart, Kolasch & Birch, LLP

[57] ABSTRACT

There is disclosed a die used to mold a cage having a cylindrical body out of a synthetic resin such that the strength of the portion of the molded cage formed by two meeting streams of the injected material is increased. The die comprises die members having parting surfaces in abutment with each other. A mold cavity conforming in shape with the cylindrical body of the cage is formed between the die members. When the die members, are in abutment with each other, a gate and a resin reservoir are formed along one parting surface and outside the mold cavity. The gate and resin reservoir are in communication with the cavity.

11 Claims, 4 Drawing Sheets

F I G. 1
F I G. 2
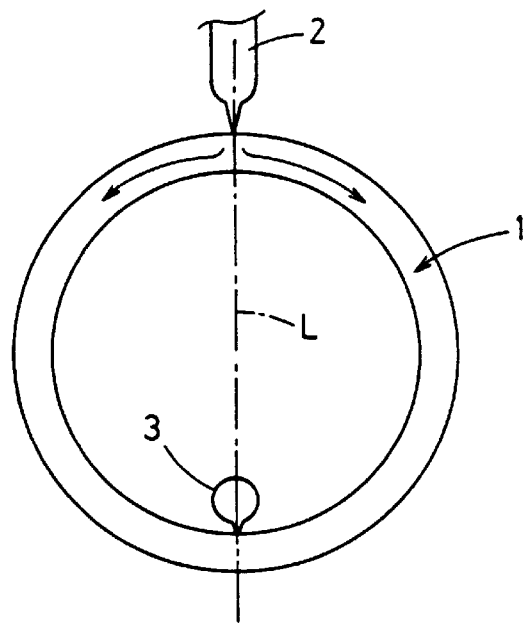
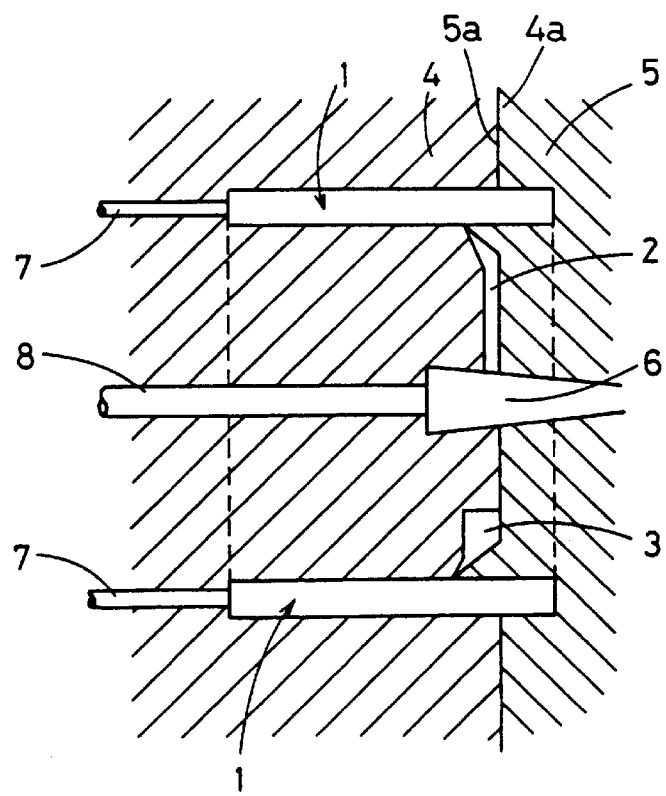

DIE AND METHOD FOR MOLDING CAGE OUT OF SYNTHETIC RESIN

BACKGROUND OF THE INVENTION

1. Field of the Invention

The present invention relates to a die used to mold a cage out of a synthetic resin and, more particularly, to a die used to mold a cage that holds balls of a ball bearing or sprags of a one-way clutch and to a method of molding such a cage, using the die.

2. Description of the Related Art

Generally, a cage made of a synthetic resin comprises a cylindrical body 10 and plural pockets 11 formed in the outer surface of the body, as shown in FIG. 6. The pockets 11 act to receive rolling balls or sprags and are circumferentially spaced from each other. The illustrated cage is a drilled cage. Besides, so-called crown-type cages (not shown) are available.

Such a cage made of a synthetic resin is normally fabricated by injection molding. This is now described in detail by referring to FIG. 7. An annular cavity 12 conforming to the profile of a molded cage is formed in a die. A molten synthetic resin is poured into the cavity 12 from a gate 13. The poured synthetic resin separates into two streams flowing to the left and to the right, respectively, inside the cavity 12. These two streams meet at the opposite side of the gate 13 and recombine into one stream.

If the resinous material poured from the gate 13 as described above moves a relatively long distance until the two streams meet at the opposite side of the gate 13, the molten resinous material cools down as the two streams go toward the meeting point. If the two cooled streams meet, a weld W weaker than other portions is formed at the meeting point. In the cage of the synthetic resin including this weld, it tends to incur breakage in use. Therefore, if the meeting point of the two streams of the poured resinous material is designed to form a thin-walled portion, the decreased cross section is combined with the weld, thus resulting in a still lower strength.

To compensate for the decrease in strength as described above, reinforcing materials such as glass fibers, carbon fibers, or metal fibers may be added. However, the added fibers disturb the orientation of the fibers at the meeting portion W of the two streams in the cage of synthetic resin. Again, the strength tends to decrease at this meeting portion W.

One method free of this drawback is to provide plural gates circumferentially spaced around the cavity. Streams of the synthetic resin poured from the gates move a short distance to the meeting points. Thus, the streams of the poured material meet such that the temperature is hardly lowered. This increases the strength of the meeting points.

However, as the number of the gates increases, the number of welds increases accordingly. Furthermore, the structure of the molding die is complicated. This complicated die is cumbersome to machine. Especially, where the molding die is designed to offer numerous molded products, gates must be increased for each of numerous cavities. Consequently, it is difficult to design the molding die itself. In addition, it is very difficult to machine the die. This leads to a great increase in the cost. For this reason, it is difficult to increase the number of gates. Moreover, the weight of the sprue runner increases. Additionally, a limitation is imposed on the maximum number of gates.

Where the cage has a large diameter, if the number of gates is increased, the gates may be more widely spaced from each other circumferentially. In this case, the poured resinous material flows a relatively long distance. Again, there arises the possibility that welds which might have insufficient strength are formed.

SUMMARY OF THE INVENTION

Accordingly, it is a main object of the present invention to provide a die capable of molding a cage out of a synthetic resin in such a way that welds formed by meeting streams of poured resinous material have improved strength.

It is another object of the invention to provide a die capable of molding a cage out of a synthetic resin with a limited number of gates such that welds formed by meeting streams of poured resinous material have improved strength.

It is a further object of the invention to provide a method of fabricating a cage, using the die described above.

The above objects are achieved in accordance with the teachings of the invention by a die used to mold a cage out of a synthetic resin, the cage having a cylindrical body. The die comprises die members having parting surfaces abutting against each other to form a mold cavity conforming to the profile of the body of the cage. When the parting surfaces are in abutment with each other, at least one gate and a resin reservoir are formed along one parting surface outside the cavity. The gate and reservoir are in communication with the cavity.

Preferably, at least one gate described above is one located around the cavity. The resin reservoir and the gate are positioned in a diametrically opposite relation.

Preferably, the resin reservoir is smaller in volume than the cavity.

Preferably, the resin reservoir is in communication with the cavity through a narrow passageway.

Where a cage is fabricated, using the above-described molding die, if streams of the poured resinous material meet at the meeting point in the cavity of the molding die such that the temperature of the front-end portions of the streams drops, the meeting streams flow out of the cavity into the resin reservoir. In consequence, no weld torms at the meeting point in the cavity.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects as well as advantages of the invention will become clear by the following description of preferred embodiments of the invention with reference to the accompanying drawings which are given by way of illustration only, and thus are not limitative of the present invention, and wherein like parts in each of the several figures are identified by the same reference numerals and wherein:

FIG. 1 is a plan view of a die used to mold a cage out of a synthetic resin, the die being built according to a first preferred embodiment of the present invention;

FIG. 2 is a cross-sectional view of the die shown in FIG. 1;

DETAILED DESCRIPTION OF THE INVENTION

Figure 6:
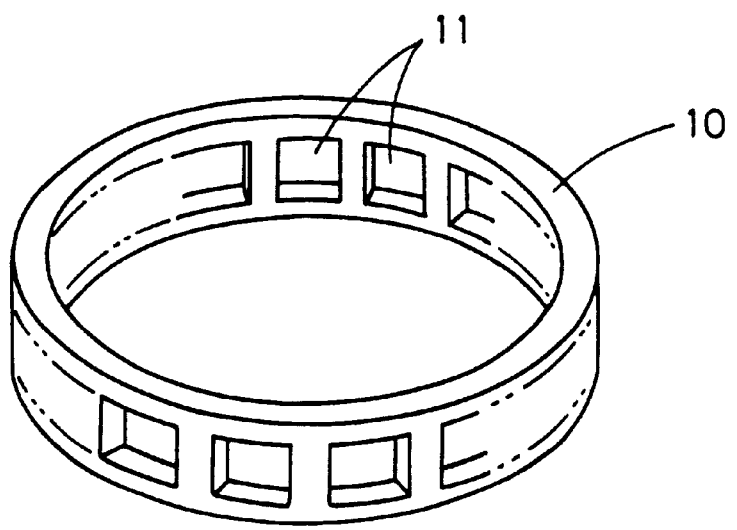
FIG. 6 is a perspective view of a conventional cage made of a synthetic resin.
Figure 7:
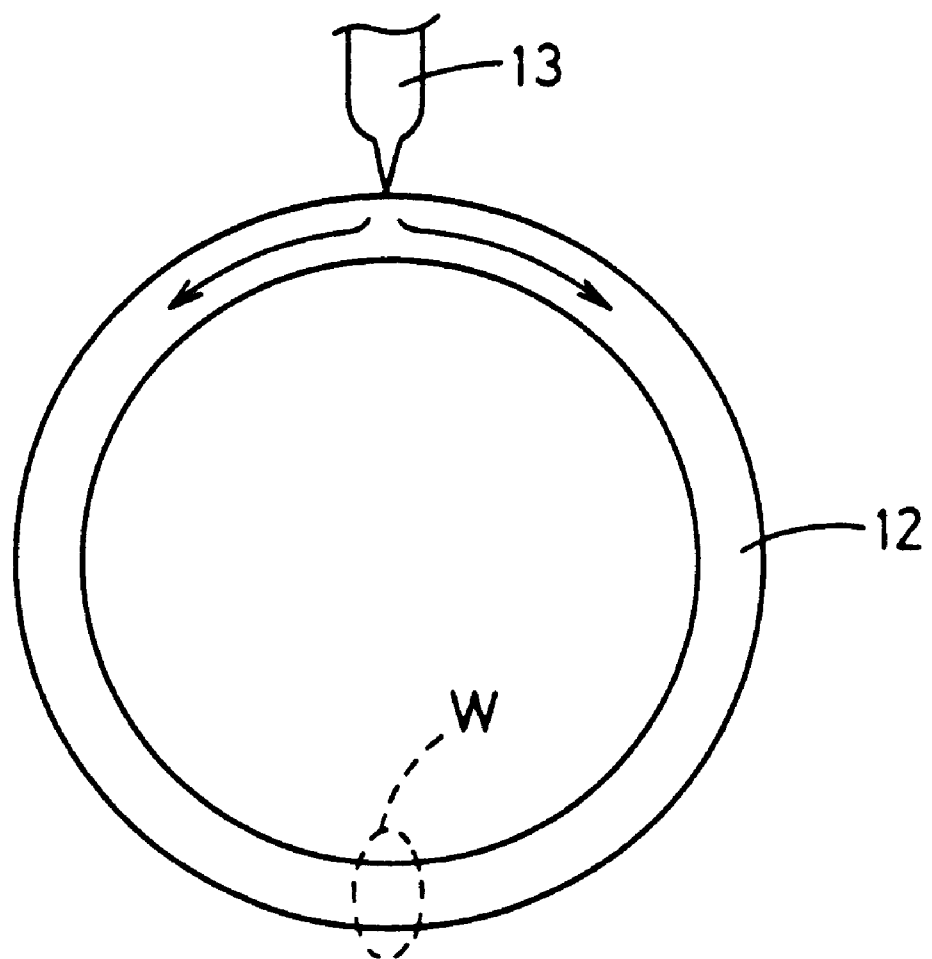
FIG. 7 is a plan view of the prior art cage used to mold a cage out of a synthetic resin.

A molding die according to a first preferred embodiment of the invention is now described by referring to FIGS. 1 and 2. The die is composed of a pair of die members 4 and 5 having parting surfaces 4a and 5a, respectively, abutting against each other to form an annular mold cavity 1 therebetween. This cavity conforms to the profile of the body 10 of a cage (FIG. 6) to be molded. Also, the abutting parting surfaces form a gate 2 and a resin reservoir 3. A synthetic resin is injected into the cavity 1 through the gate 2. The reservoir 3 allows meeting streams of the resinous material to be stored outside the cavity 1.

The molding die according to the first embodiment of the invention has only one gate 2, which is located at one circumferential position on the cavity 1. The resin reservoir 3 is placed at the meeting point of the streams of the resinous material inside the cavity 1. The reservoir 3 is located on a diametrical line L passing through the center of the cavity 1 and through the opening of the gate 2. Also, the reservoir 3 is on the opposite side of the gate 2. The resin reservoir 3 is smaller in internal volume than the cavity 1 and in communication with the cavity 1 by way of a narrow passageway.

The gate 2 is outside the cavity 1, while the resin reservoir 3 is inside the cavity 1. As shown in FIG. 2, the gate 2 and the resin reservoir 3 may be formed inside the cavity 1 and along the parting surfaces 4a and 5a of the die members 4 and 5, respectively. Alternatively, the gate 2 and the resin reservoir 3 may be formed outside the cavity 1 in a manner not illustrated. The die further includes a sprue runner 6 and ejector pins 7, 8. The sprue runner 6 is in communication with the gate 2.

Where a retainer or cage molded, using the die according to the first embodiment of the invention, is a cage for a roller bearing, the openings of the gate 2 and of the resin reservoir 3 are preferably formed inside the cavity 1 and in a thick-walled portion between pockets. Where the cage fabricated through the use of the die is used for a roller bearing such as a cylindrical roller or needle roller, the openings of the gate 2 and of the resin reservoir 3 may be formed either in a pillar portion between pockets or in an annular portion provided the gate 2 and the reservoir 3 are outside the cavity 1.

In the structure described above, a molten synthetic resin is poured into the cavity 1 from the gate 2. The poured material separates into two streams flowing in opposite directions inside the cavity 1 as indicated by the arrows and subsequently meet at the resin reservoir 3 located on the opposite side of the gate 2.

Since an opening is formed in the resin reservoir 3 that is at the meeting point, the front-end portions of the two streams of the resinous material meet and flow out of the cavity 1 into the resin reservoir 3. As a result, no weld is generated at the meeting point. This adds greatly to the strength of the bonding strength of the meeting point.

After loading the resinous material into the cavity 1 and into the resin reservoir 3 in this way, the material cures, thus completing a desired cage. A resinous mass formed inside the reservoir 3 is continuous with this cage. This resinous mass is removed with the body of the cage from the die. Then, the resinous mass is separated from the body of the cage. The resinous mass may also be separated when the cured product is taken from the die. The gate may be a side gate, pin gate, or other gate. The gate can produce the same advantages, whether the gate is located inside or outside the cage or in an end surface. In the first embodiment of the invention, the die uses one gate. Examples of gates using plural gates are given below.

In dies equipped with plural gates, these gates are normally circumferentially regularly spaced from each other around the cavity. The two streams of the resinous material injected into the cavity meet at the midway point of each region between the successive gates. Therefore, there exist plural meeting points of the streams in these regions. Every meeting point is provided with a resin reservoir similar to that of the first embodiment of the invention.

In this type of multiple-gate die, the resin reservoirs are as many as the gates. Since the resinous masses formed in the resin reservoirs are discarded similarly to the sprue runner, if the number of the resin reservoirs is increased, the amount of wasted resinous material will increase. Second through fourth embodiments of the present invention given below use dies each having plural gates.

Figure 3:
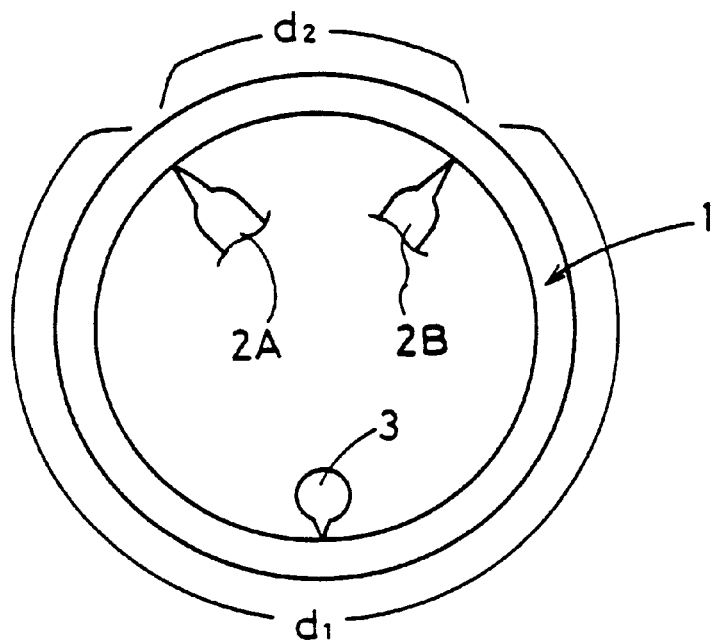
FIG. 3 is a plan view similar to FIG. 1, but illustrating a die according to a second preferred embodiment of the invention.

A die used to mold a cage out of a synthetic resin in accordance with the second preferred embodiment of the invention is now described by referring to FIG. 3. In this embodiment, two gates 2A and 2B are foried and circumferentially spaced from each other around a mold cavity 1 formed by the die. It is to be noted that these gates 2A and 2B are not uniformly circumferentially spaced around the cavity. The two gates 2A and 2B form a major circumferential region $d_1$ and a minor circumferential region $d_2$. That is, $d_1 > d_2$. The streams of the resinous material poured into the cavity 1 from the gates 2A and 2B meet at the midway points in the two regions $d_1$ and $d_2$. In this second embodiment, one resin reservoir 3 is formed at the meeting point of the streams in the major circumferential region $d_1$.

In the molding die according to the second embodiment, the synthetic resin injected from the gates 2A and 2B separates into two opposite streams from the injection position. The streams of the material meet at the midway points in the circumferential regions $d_1$ and $d_2$.

In the minor circumferential region $d_2$ of these two regions $d_1$ and $d_2$, the streams travel a short distance until they meet and so the two streams quickly meet. Therefore, little temperature drop takes place in this minor region $d_2$. Hence, the bonding strength of this meeting point is increased.

On the other hand, in the major circumferential region $d_1$, the two streams of the injected material move a long distance until they meet. Therefore, the front-end portions of the streams tend to suffer from large temperature drops. However, the resin reservoir 3 is formed at the meeting point in this major circumferential region $d_1$. Thus, the front-end portions of the streams meet and go out of the cavity 1 into the resin reservoir 3. In consequence, no weld forms unlike in the prior art technique.

In this second embodiment of the invention described above, there exists only one resin reservoir 3 in the same way as in the first embodiment. Therefore, only a limited amount of resin is wastefully consumed.

Figure 4:
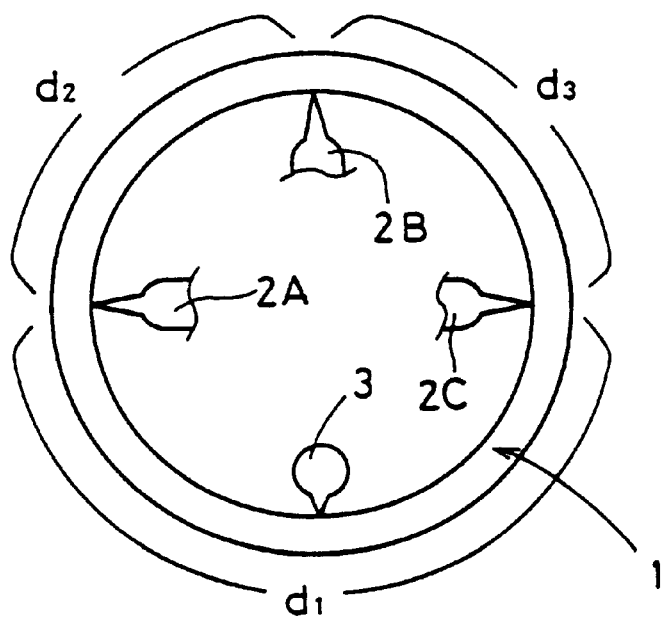
FIG. 4 is a plan view similar to FIG. 1, but illustrating a die according to a third preferred embodiment of the invention.

Referring next to FIG. 4, there is shown a die used to mold a cage out of a synthetic resin in accordance with the third preferred embodiment. Three gates 2A, 2B, and 2C are formed on a mold cavity 1 in the die and circumferentially spaced from each other. A major circumferential region $d_1$ is formed between the gates 2A and 2C. Minor circumferential regions $d_2$ and $d_3$ are formed between the gates 2A and 2B and between the gates 2B and 2C, respectively. ($d_1 > d_2, d_3$) One resin reservoir 3 is formed at the meeting point located at the midway point in the major circumferential region $d_1$.

In the minor circumferential regions $d_2$ and $d_3$, the streams flow only limited distance until they meet. Therefore, in these minor regions, the streams of the injected synthetic resin quickly meet with almost no temperature drop. Hence, the bonding strength of the meeting points is increased. In the major circumferential region $d_1$, the streams of the injected material move a relatively long distance until they meet. Therefore, the front-end portions of the streams tend to suffer from temperature drop. However, the resin reservoir 3 formed at the meeting point causes the front-end portions of the streams to meet and enter the reservoir 3 from the cavity 1. For this reason, no weld appears unlike in the prior art technique. Also, in this third embodiment, there exists only one resin reservoir in the same way as in the first and second embodiments. Consequently, only a limited amount of resin is wasted.

Figure 5:
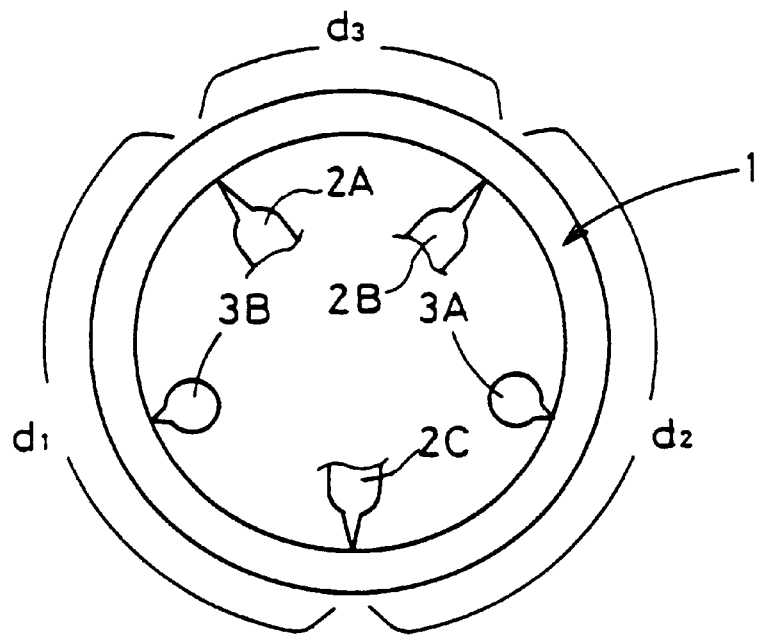
FIG. 5 is a plan view similar to FIG. 1, but illustrating a die according to a fourth preferred embodiment of the invention.

Referring next to FIG. 5, there is shown a molding die according to the fourth preferred embodiment of the invention. In this embodiment, there exist three gates 2A, 2B, and 2C. Major circumferential regions $d_1$ and $d_2$ are formed between the gates 2A and 2C and between the gates 2B and 2C, respectively. A minor circumferential region $d_3$ is formed between the gates 2A and 2B. ($d_1, d_2 > d_3$) Resin reservoirs 3B and 3A are formed at the meeting points in the two major circumferential regions $d_1$ and $d_2$, respectively.

In this fourth embodiment, the injected synthetic resin behaves in the major and minor circumferential regions in the same way as in the third embodiment. Therefore, description of the synthetic resin is omitted here. In this embodiment, a great drop in the strength of the meeting points of the streams of the molten material and generation of welds can be prevented.

In this fourth embodiment, the two resin reservoirs 3A and 3B are provided and so the amount of resin wasted is somewhat larger than in the first through third embodiments. However, this embodiment is especially adapted for the fabrication of a large cage on which gates cannot be closely spaced from each other.

As described in connection with the second through fourth embodiments of the invention, where the die has plural gates, one of plural circumferential regions formed between the gates is so short that a large strength drop is not induced. In longer circumferential regions, resin reservoirs are formed at meeting points of streams of the injected resinous material. Even in this case, the number of the resin reservoirs should be reduced to a minimum to decrease the amount of wasted resin.

While there have been described what at present considered to be the preferred embodiments of this invention, it will be understood that various modifications may be made therein, and it is intended to cover in the appended claims all such modifications as fall within the true spirit and scope of this invention.

What is claimed is:

1. A method of molding a cage having a cylindrical body formed out of a synthetic resin, said method comprising the steps of:

preparing a die having a mold cavity, at least two gates, and a resin reservoir in communication with said mold cavity;

injecting said synthetic resin in a molten state into said mold cavity via said at least two gates so that said synthetic resin separates into two streams flowing in opposite directions from each one of said at least two gates inside said mold cavity, one of two streams from each of said at least two gates flowing a distance less than an opposite flowing stream, wherein the one stream from each of said at least two gates flowing the distance less than an opposite flowing stream fails to be stored in said resin reservoir; and storing said synthetic resin in said resin reservoir in a position where the other of one of two streams from each of said at least two gates meet.

2. A method of molding a cage having a cylindrical body formed out of a synthetic resin, said method comprising the steps of:

preparing a die having a mold cavity, a plurality of gates, and a resin reservoir in communication with said mold cavity;

injecting said synthetic resin in a molten state into said mold cavity via said plurality of gates so that said synthetic resin separates into two streams flowing in opposite directions from each of said plurality of gates inside said mold cavity, one of two streams from each of said plurality of gates flowing a distance less than an opposite flowing stream, wherein the one stream from each of said plurality of gates flowing the distance less than an opposite flowing stream fails to be stored in said resin reservoir; and storing said synthetic resin in said resin reservoir in a position where the other of one of two streams from each of said plurality of gates meet.

3. A die consisting of a pair of die members adapted to mold a cage out of a synthetic resin, said cage having a cylindrical body, said die comprising:

parting surfaces abutting against each other to form a mold cavity conforming in shape with said body of said cage, said mold cavity providing a space in which said synthetic resin flows when said synthetic resin is injected into said mold cavity from at least two gates;

said at least two gates are circumferentially spaced from each other around said mold cavity, said two gates form a major circumferential region and a minor circumferential region; and a resin reservoir formed along one of said parting surfaces and located outside said mold cavity when said parting surfaces are in abutment with each other, said reservoir being in communication with said mold cavity, said reservoir being located in said major circumferential region in a position where two opposite flowing synthetic resin streams meet.

4. The die of claim 3, wherein said resin reservoir is narrower in volume than said mold cavity.

5. The die of claim 3, wherein said resin reservoir is in communication with said mold cavity via a narrow passageway.

6. The die of claim 3, wherein said at least two gates are three gates circumferentially spaced from each other around said mold cavity, said three gates form two minor circumferential regions and one major/circumferential region therebetween, and said resin reservoir is located in said major circumferential region in said position where said two streams meet.

7. The die of claim 6, wherein said three gates form two major circumferential regions and one minor circumferential region therebetween, one resin reservoir is located in each of said two major circumferential regions, each one of said resin reservoir receiving two opposite flowing synthetic resin streams.

8. The die of claim 3, wherein a sprue runner is in communication with at least one of at least two gates.

9. The die of claim 3, further comprising:
   at least one ejector pin, said at least one ejector pin facilitating separation of the parting surfaces.

10. The die of claim 9, wherein said at least one ejector pin is two ejector pins facilitating separation of the parting surfaces.

11. A die consisting of a pair of die members adapted to mold a cage out of a synthetic resin, said cage having a cylindrical body, said die comprising:
   parting surfaces abutting against each other to form a mold cavity conforming in shape with said body of said cage, said mold cavity providing a space in which said synthetic resin flows when said synthetic resin is injected into said mold cavity from a plurality of gates;
   said plurality of gates circumferentially spaced from each other around said mold cavity, said plurality of gates form a major circumferential region and minor circumferential regions therebetween; and
   a resin reservoir formed along one of said parting surfaces and located outside said mold cavity when said parting surfaces are in abutment with each other, said reservoir being in communication with said mold cavity, said reservoir being located in said major circumferential region in a position where two opposite flowing synthetic resin streams meet.

* * * * *